United States Patent
Chang et al.

(10) Patent No.: US 8,909,846 B2
(45) Date of Patent: Dec. 9, 2014

(54) MEMORY STORAGE DEVICE AND CONTROL METHOD THEREOF

(75) Inventors: Li-Pin Chang, Banciao (TW);
Ming-Dar Chen, Hsinchu (TW);
Chien-Ting Huang, Sinjhuang (TW)

(73) Assignee: A-Data Technology Co., Ltd., Taipei (TW)

( * ) Notice: Subject to any disclaimer, the term of this patent is extended or adjusted under 35 U.S.C. 154(b) by 1036 days.

(21) Appl. No.: 12/320,141

(22) Filed: Jan. 21, 2009

(65) Prior Publication Data

US 2010/0017555 A1    Jan. 21, 2010

(30) Foreign Application Priority Data

Jul. 18, 2008    (TW) .............................. 97127299 A (51) Int. Cl.
*G06F 12/02*    (2006.01)

(52) U.S. Cl.
CPC .... *G06F 12/0246* (2013.01); *G06F 2212/7211* (2013.01)

USPC .................................. 711/103; 711/E12.008

(58) Field of Classification Search
None
See application file for complete search history.

(56) References Cited

U.S. PATENT DOCUMENTS

| | | | |
|---|---|---|---|
| 2004/0083335 A1* | 4/2004 | Gonzalez et al. | 711/103 |
| 2006/0106972 A1* | 5/2006 | Gorobets et al. | 711/103 |
| 2007/0083698 A1* | 4/2007 | Gonzalez et al. | 711/103 |
| 2008/0235468 A1* | 9/2008 | Chen et al. | 711/154 |
| 2009/0157952 A1* | 6/2009 | Kim et al. | 711/103 |

* cited by examiner

*Primary Examiner* — Charles Rones
*Assistant Examiner* — Ryan Dare
(74) *Attorney, Agent, or Firm* — Rosenberg, Klein & Lee (57) ABSTRACT

A control method of a memory storage device for writing an updated data from a host to the memory storage device is provided. The memory storage device provides storage space which is divided into a plurality of physical blocks to access the updated data. The control method includes the following steps: first, determining whether the updated data is a hot data or not; finally, storing the less updated data which is not the hot data into the physical block which has the higher erase counts according to the result of above determination.

10 Claims, 9 Drawing Sheets

MEMORY STORAGE DEVICE AND CONTROL METHOD THEREOF

BACKGROUND OF THE INVENTION

1. Field of the Invention

The present invention relates to a control method of memory storage device; in particular, to a control method for wear-leveling in the memory device.

2. Description of Related Art

Non-volatile memory storage devices using NAND-typed Flash memory as storage media provide advantages of small size, low power consumption, quietness in use and endurance against vibration and so forth, and at present they are commonly applied in hosts (e.g. various electronic devices) in a broad range of different forms. For example, they can be employed in network servers, notebook computers, handheld MP3 music players, general desktop PC, digital cameras etc.

Figure 1:
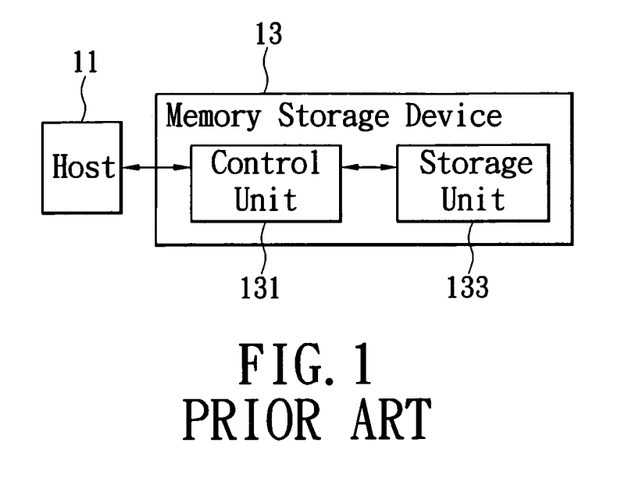
FIG. 1 shows a system architecture diagram for an embodiment of the conventional memory storage device.

Refer first to FIG. 1, wherein a system architecture diagram for an embodiment of the conventional memory storage device is shown. As depicted in FIG. 1, the memory storage device 13 comprises a control unit 131 and a storage unit 133, in which the storage unit 133 is composed of Flash memories for data storage; the control unit 131 is coupled to the host 11 to receive the command issued from the host 11 for required operations, and to perform data access operations in accordance with the operations assigned by the received commands, thereby recording the data inputted by the host 11 to the storage unit 133 or, alternatively, reading from the storage unit 133 the data required by the host 11 and send it back.

The storage unit 133 consists of physical storage space formed by a plurality of physical blocks for data access, with each physical block increasing its own accumulated erase count because of the erase action taken after moving off the data originally stored therein; when the extent of wearing approaches to its useable life cycle, the reliability of data retention for data storage gradually deteriorates to a level unable to reliably recording data, finally leading to permanent failure in the storage device due to deterioration occurring in partial physical blocks of the storage device. As a result, in order to reduce the difference between the accumulated erase count of each respective physical block, it is necessary to balance each physical block through the wear-leveling technology so as to avoid overly use of certain portion of the physical blocks which may cause undesirable early termination of the life cycle, resulting in a situation that the storage device fails to reliably store correct data before other physical blocks are sufficiently employed.

Currently proposed wear-leveling technologies can be largely classified as dynamic wear-leveling and static wear-leveling. The dynamic wear-leveling is that, upon modification or update of the stored data recorded in the physical blocks, it selects among the erased physical blocks the one having lowest accumulated erase count to store the updated data. Since only the dynamic data whose contents have been updated or changed will be adjusted with regards to storage location thereof, it is therefore referred as dynamic wear-leveling technology.

On the other hand, the static wear-leveling is to start static wear-leveling operations when the difference between the highest and lowest accumulated erase counts reaches a prescribed threshold among the physical blocks allocated with data, even though the stored data recorded in such physical blocks has not been modified or updated. In the static wear-leveling operations, the controller will move the data in the physical block having the lowest accumulated erase count into the one having the highest accumulated erase count, and then erase the physical block having the lowest accumulated erase count. Thereby, it is possible to change the location of the physical block used by the static data, and release the physical block previously occupied in long term by the static data and accordingly having lower accumulated erase count, thus enabling its use by subsequent updated data, further achieving the effects of location adjustment in the physical block used by the static data and implementation of static wear-leveling.

However, the aforementioned wear-leveling operations require huge amounts of time and resources to search the physical block with lower accumulated erase count, and the dynamic wear-leveling is simply addressed to the blocks having updated data for wear-leveling, thus the defect of uneven wear-leveling still exists. Therefore, how to improve the performance of wear-leveling has been one challenging issue for breakthrough in such a technical field.

SUMMARY OF THE INVENTION

Regarding to the above-said issues, in order to effectively increase the useable life cycle of the memory storage device, the present invention herein proposes a control method of memory storage device, which selects the way of memory wear-leveling operation through tracing the data update location, thereby providing a more reliable and efficient approach to eliminate the problem of uneven wear-leveling in physical storage space.

Accordingly, the objective of the present invention is to provide a memory storage device and the control method thereof, in expectation of, upon allocating updated data to the memory, achievement of uniform wear-leveling, further increasing the useable life cycle of the memory, preventing undesirable waste of storage resources, and also simplifying the wear-leveling operations so as to enhance the performance of data storage in the memory.

The present invention discloses a memory storage device and the control method therefore, applicable for allowing a host to write data into the memory storage device, wherein the file system existing in the host provides storage space composed of a plurality of logical blocks, and the memory storage device provides storage space composed of a plurality of physical blocks corresponding to the logical blocks in the said file system. The storage device further consists of a hot data list, which having a plurality of specific Logical Block Addresses (LBA's); and a source pointer register, the address stored therein pointing to a logical block used as the data source block in the static wear-level operation; the steps of the said control method comprise, initially, performing a dynamic wear-leveling operation if it is determined to intend to execute a write operation for the updated data; next, adding the logical block address storing such updated data in the hot data list; then comparing and determining whether the logical block address of the source pointer register exists in the hot data list; finally, adjusting the source pointer register based on the comparison in order to change the logical block pointed thereto, further ensuring, during the static wear-leveling operation on the storage device, the stored contents corresponding to the logical block address not appearing in the hot data list to be moved at higher priority to the physical block having higher erase count.

In one embodiment of the present invention, in determining whether to execute an erase operation, it determines whether the erase count in a physical block to be erased is greater than a threshold; if yes, then a static wear-level operation is performed, which moves the data in the corresponding physical block of the logical block to which the source pointer register points to the physical block having higher erase count.

The present invention further discloses a memory storage device applicable for allowing a host to access data, wherein the file system existing in the host provides storage space composed of a plurality of logical blocks. The said memory storage device comprises a storage unit and a control unit. The storage unit consists of storage space composed of a plurality of physical blocks for data access; the control unit is coupled between the host and the storage unit, consisting of a temporary unit and a microprocessor. The microprocessor is coupled to the temporary unit; the temporary unit includes a hot data list and a source pointer register. The hot data list records the addresses of a plurality of specific logical blocks storing the hot data; the address stored in the source pointer register points to one of the plurality of logical blocks provided by the file system. After the host issuing a data update command to write the updated data into the storage unit, the hot data list records the address of the logic block recording such updated data, then the microprocessor compares and determines whether the address of the logical block registered in the source pointer register matches the address of the specific logical block recorded in the hot data list, allowing to, based on the comparison, selectively adjust the contents of the source pointer register or execute a static wear-leveling operation, further moving the non-hot data stored in the original physical block to the physical block having higher erase count.

In one embodiment of the present invention, the said source pointer register is adjusted by the microprocessor, causing the source pointer register to sequentially point to the next logical block.

The above-said summary and following detailed descriptions and appended drawings are all herein set forth for further illustrating the approaches, means and effects taken by the present invention to achieve the prescribed objectives. Other goals and advantages in relation with the present invention will be further explained in the subsequent descriptions and appended drawings.

BRIEF DESCRIPTION OF THE DRAWINGS

FIGS. 4A~7B show diagrams for an embodiment of the data process according to the present invention.

DETAILED DESCRIPTION OF PREFERRED EMBODIMENTS

The essential technical characteristics of the present invention lie in the control method for uniform erase operations in the memory storage device and the memory storage device architecture employing such a method, and the following texts provide the necessary internal system architecture and operation flows thereof; those skilled ones in the art can, however, appreciate that, except the said elements illustrated hereinafter, the memory storage device may certainly comprise other required components as desired. Therefore, it is not intended to be limited by what disclosed in the embodiments of the present invention.

Figure 2:
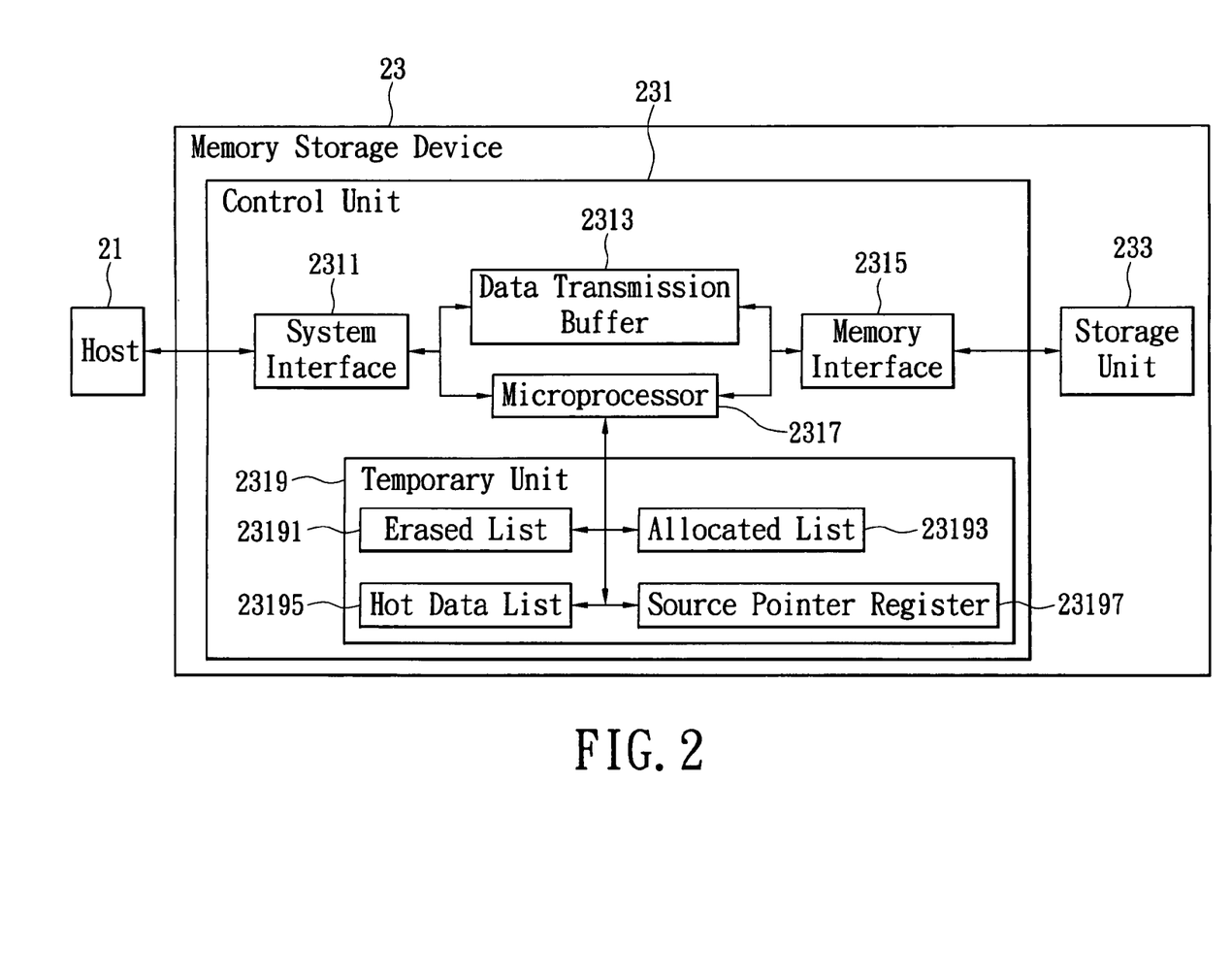
FIG. 2 shows a system architecture diagram for an embodiment of the memory storage device according to the present invention.

Initially, refer to FIG. 2, wherein a system architecture diagram for an embodiment of the memory storage device according to the present invention is shown. As depicted in FIG. 2, the memory storage device 23 is coupled to a host 21, receiving commands from the host 21 to perform operations like data read, data write or erase operations on the storage block.

The memory storage device 23 comprises a storage unit 233 and a control unit 231. The storage unit 233 is composed of Flash memories, used to store data required by the host 21; the control unit 231 is coupled between the host 21 and the storage unit 233 to receive the command issued by the host 21, in which the said command may be a write command or a read command, which write command writing the data corresponding to a logical address into the storage unit 233, while which read command reading the data corresponding to a logical address from the storage unit 233.

The control unit 231 consists of a system interface 2311, a data transmission buffer 2313, a memory interface 2315, a microprocessor 2317 and a temporary unit 2319. The system interface 2311 is coupled to the host 21, acting as the transmission interface of command and data between the host 21 and the memory storage device 23; the data transmission buffer 2313 is coupled to the system interface 2311 for data temporary; the memory interface 2315 is coupled between the data transmission buffer 2313 and the storage unit 233, thereby controlled by the microprocessor 2317 for data transmissions; and the microprocessor 2317 is coupled to the temporary unit 2319 to control the operations of each component in the memory storage device 23.

In one embodiment of the present invention, the said storage unit 233 is formed by a combination including one or more items in following group: Single-Level Cell (SLC) memory, Phase-Changed Memory (PCM), free Ferro-electronic Random Access Memory (FeRAM), Magnetic Random Access Memory (MRAM) or Multi-Level Cell (MLC) memory.

Figure 3A:
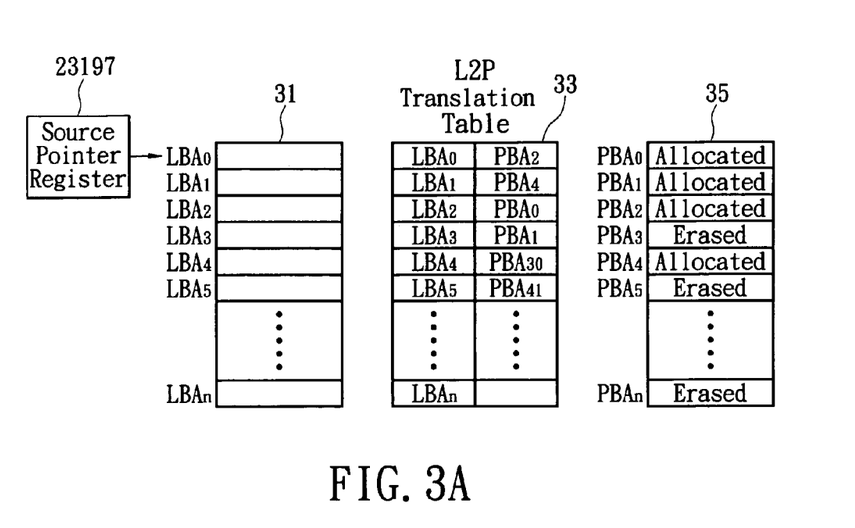
FIG. 3A shows a storage architecture diagram for an embodiment of the logical/physical block translation according to the present invention.

To further understand the correspondence of the logical/physical addresses, reference can be made to FIG. 3A, wherein a diagram for an embodiment of the logical/physical block translation according to the present invention is shown. Relevant system architecture thereof can be also conjunctively referred to FIG. 2. As depicted in FIG. 3A, the file system of the host 21 and the storage unit 233 respectively provides logical storage space 31 and physical storage space 35 for data access, wherein the logical storage space 31 is divided into a plurality of logical blocks $LBA_0$~$LBA_n$, the physical storage space 35 divided into a plurality of physical blocks $PBA_0$~$PBA_n$, and the correspondence between the logical blocks $LBA_0$~$LBA_n$ and the physical blocks $PBA_0$~$PBA_n$ is recorded by a Logical to Physical (L2P) Translation Table.

Figure 3B:
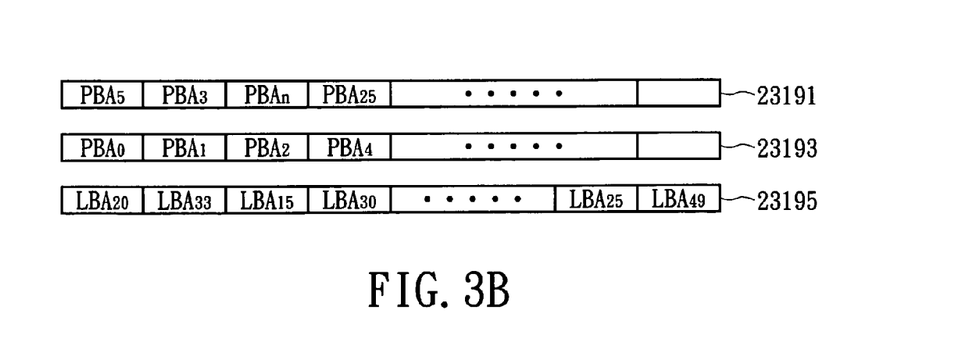
FIG. 3B shows a data structure diagram for the storage space management according to the present invention.

Refer conjunctively to FIG. 3B, wherein a data structure diagram for the storage space management according to the present invention is shown. As depicted in FIG. 3B, to facilitate convenient management on the usage of the physical storage space 35, in the temporary unit 2319 there specifically store an erased list 23191, an allocated list 23193, a hot data list 23195 and a source pointer register 23197. The erased list 23191 is used to record the addresses of the erased physical blocks $PBA_i$; in one embodiment, the erased list 23191 records therein the addresses of the erased physical blocks $PBA_i$ based on the accumulated erase count in each of the erased physical blocks $PBA_i$ sequentially from low to high (or contrarily from high to low as well); referring to FIG. 3B, the erase count in the physical blocks $PBA_5$ is the lowest, and the erase counts in the other physical blocks $PBA_i$ become greater as moving toward right side. In addition to indicating the amount of erase count in terms of value order, the erased list 23191 can alternatively add an extra field to record the erase count of the each erased physical block $PBA_i$, rather than being limited to the present embodiment.

In one embodiment of the present invention, the erased list 23191, allocated list 23193, hot data list 23195 and source pointer register 23197 may be also stored or placed in a Random Access Memory external to the control unit 231 to avoid losses in case of power-off in the memory storage device 23, and the control unit 231 can copy them into the storage unit 233 and has them loaded in upon start of the memory storage device 23.

The allocated list 23193 is used to record the address of the physical blocks $PBA_i$ already allocated with data; the hot data list 23195 records the addresses of a plurality of logical blocks wherein such plurality of logical blocks are the logical blocks $LBA_i$ storing the more frequently updated data (i.e. hot data). The addresses stored in the source pointer register 23197 sequentially point to the logical blocks $LBA_i$ storing data; that is, assuming the logical block $LBA_0$ stores data, then the source pointer register 23197 stores the address of the logical block $LBA_0$.

Figure 4A:
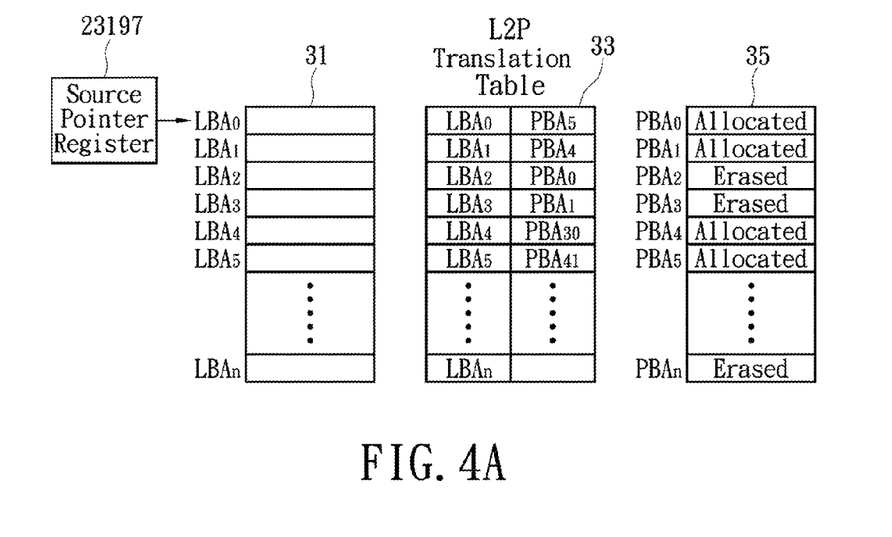

The subsequent FIGS. 4A~7B illustrate diagrams for an embodiment of data process according to the present invention, which describe the wear-leveling operations taken upon write of the updated data stored in the logical block $LBA_0$. First of all, referring to FIG. 3A, original data is stored in the logical block $LBA_0$, and after mapping through the L2P translation table 33, it is appreciated the original data is actually stored in the physical block $PBA_2$. Next, in case it is intended to perform data update on the original data, the control unit 231 selects the physical block $PBA_5$ having the least accumulated erase count from the erased list 23191 so as to store the updated data and the original data placed in the physical block $PBA_2$. Subsequently, as shown in FIGS. 4A and 4B, the microprocessor 2317 deletes the physical block $PBA_5$ from the erased list 23191 based on the above-said operations, while alternatively adding it into the allocated list 23193 and recording the address of the logical block $LBA_0$ in which the data update operation occurred into the hot data list 23195.

Figure 5A:
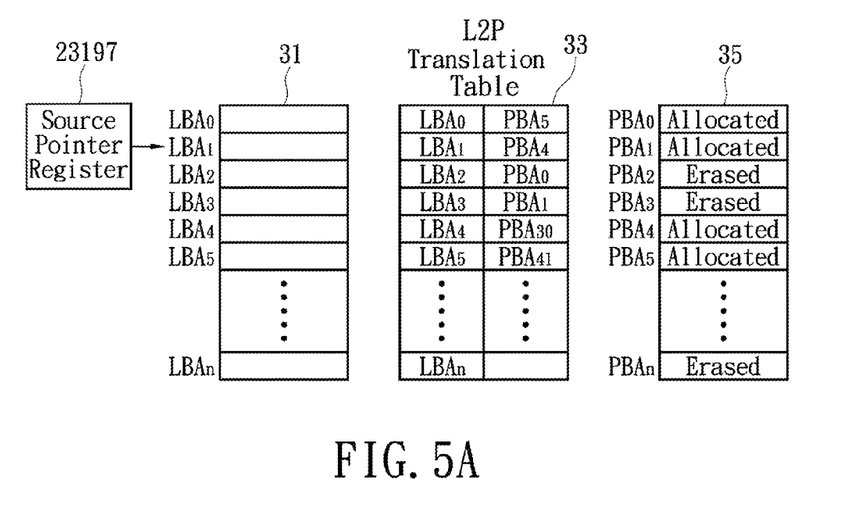
Figure 5B:
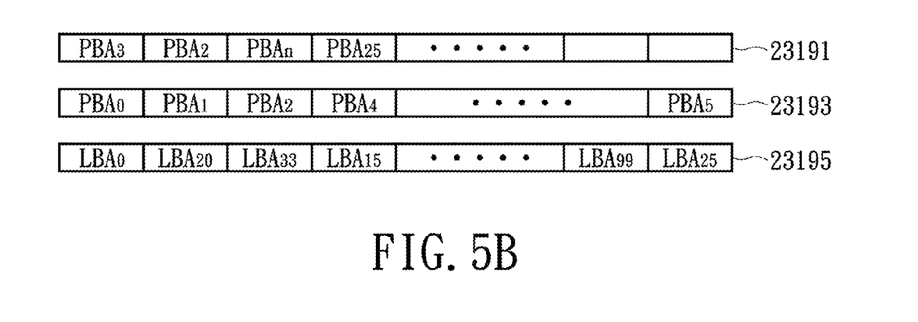

After updating the hot data list 23195, the microprocessor 2317 then determines whether the logical block $LBA_i$ to which the source pointer register 23197 points is a specific logical block pointed in the hot data list 23195, as shown in FIGS. 5A and 5B. Since the logical block $LBA_0$ to which the source pointer register 23197 points exists in the hot data list 23195, the source pointer register 23197 sequentially points to the next logical block $LBA_1$ which is compared with the specific logical block pointed in the hot data list 23195. Such a procedure repeats, until the address of one logic block to which the source pointer register 23197 points is not recorded in the hot data list 23195, then the physical block $PBA_2$ storing the original data is erased, further placing the physical block $PBA_2$ at a suitable position in the erased list 23191 based on the value of the accumulated erase count; in the present embodiment, since the erase count of the physical block $PBA_2$ is between the ones of the physical block $PBA_3$ and the physical block $PBA_n$, the order at which the erased list 23191 stores the erased physical blocks is shown as FIG. 5B.

A threshold can be particularly defined in the memory storage device 23, in which suppose the accumulated erase count of any one of the erased physical blocks $PBA_i$ is greater than the threshold, indicating there in the storage unit 233 existing physical blocks $PBA_i$ having overly high erase counts, a wear-leveling operation is accordingly required to be performed to move the less updated data into such physical blocks $PBA_i$ having overly high erase counts, thereby avoiding excessive erase operations performed on such physical blocks $PBA_1$. In one embodiment, the threshold EC is the sum of the average erase count $EC_{avg}$ of all physical blocks $PBA_i$ and a prescribed threshold offset $EC_{th}$, and the system needs only to adjust the value of the threshold offset $EC_{th}$ to conveniently modify the execution frequency of the static wear-leveling operations; in the case of increasing the value of the threshold offset $EC_{th}$, the execution frequency of the static wear-leveling operations can be reduced, and vice versa.

Therefore, after erasing the physical blocks $PBA_2$, the microprocessor 2317 increments the accumulated erase count of the block by 1 and updates the average erase count $EC_{avg}$, then determines whether the erase count of the physical blocks $PBA_2$ is greater than the updated threshold; if yes, indicating the condition for executing weal-leveling is fulfilled, then the weal-leveling operation is accordingly performing.

Figure 6A:
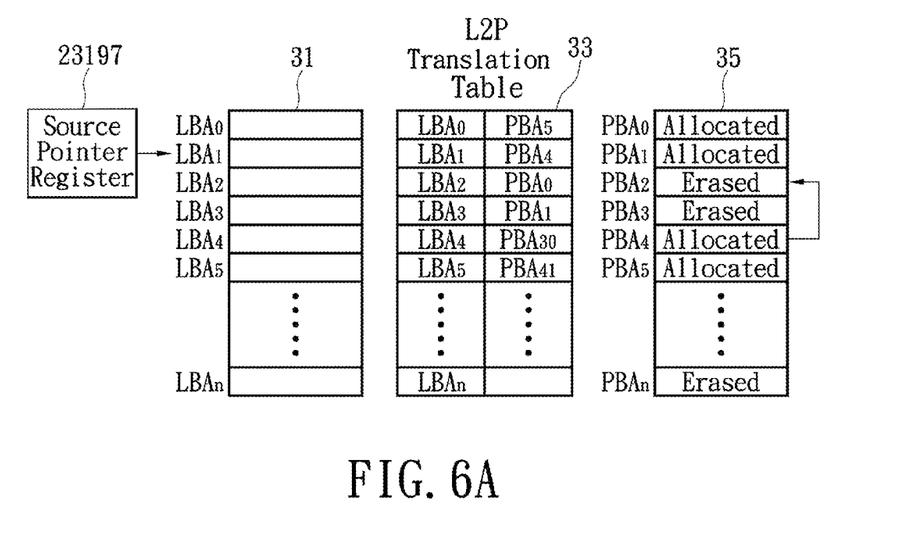
Figure 6B:
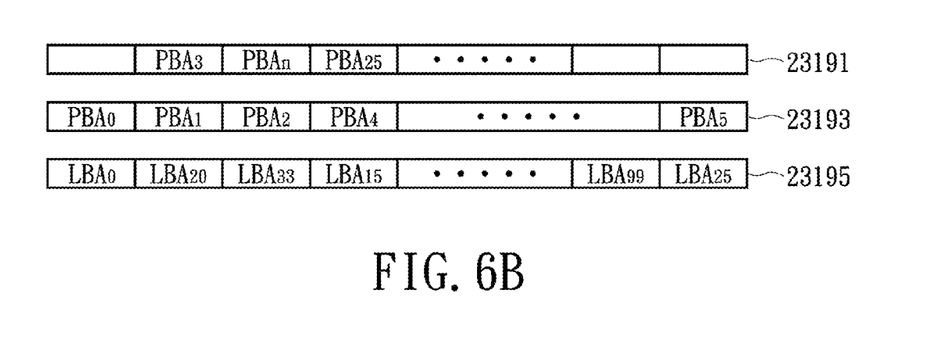

Suppose the physical blocks $PBA_2$ has met the wear-leveling condition, and the address of the logical block $LBA_1$ to which the source pointer register 23197 points does not appear in the hot data list 23195, it can be determined that the data in the logical block $LBA_1$ is infrequently updated which should be moved to the physical block $PBA_2$ having overly high erase count to prevent the physical block $PBA_2$ from undertaking excessive erase wearing. Accordingly, as shown in FIGS. 6A and 6B, the microprocessor 2317 copies the data stored in the corresponding physical block $PBA_4$ of the logical block $LBA_1$ to which the source pointer register 23197 points to the physical block $PBA_2$ and erases the physical block $PBA_4$, and then the physical block $PBA_2$ is deleted from the erased list 23191, subsequently placed in the allocated list 23193.

Figure 7A:
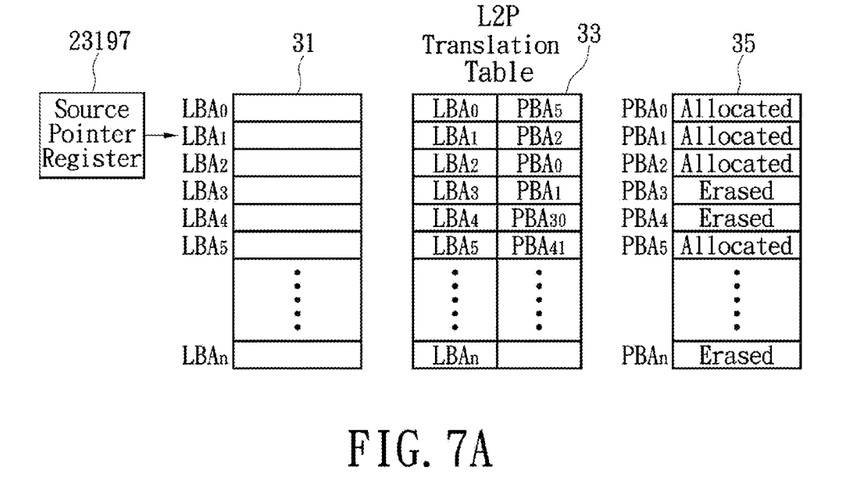
Figure 7B:
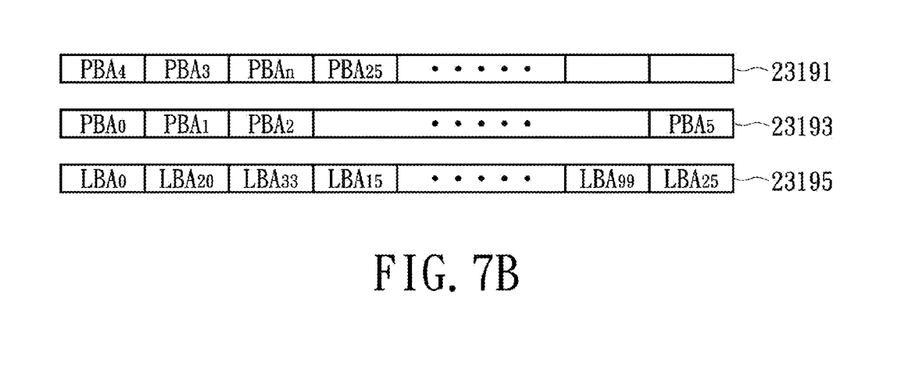

Following this, as shown in FIGS. 7A and 7B, after the aforementioned wear-leveling operations, it updates the L2P translation table 33 to cause the logical block $LBA_1$ to correspond to the physical block $PBA_2$; meanwhile, since the physical block $PBA_4$ has been erased for writing in other data, it is thus also necessary to update the accumulated erase count of the physical block $PBA_4$ and the average erase count $EC_{avg}$.

Afterward, the source pointer register 23193 sequentially points to the next logical block $LBA_2$, and the above-illustrated comparison process with the hot data list 23195 is repeated, until the logical block $LBA_1$ to which the source pointer register 23193 points does not appear in the hot data list and the execution condition of wear-leveling is not fulfilled, thereby completing an entire wear-leveling operation.

Figure 4B:
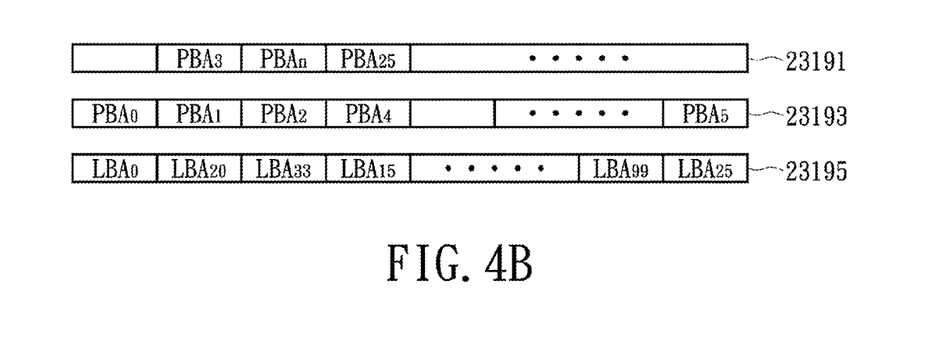
Figure 8:
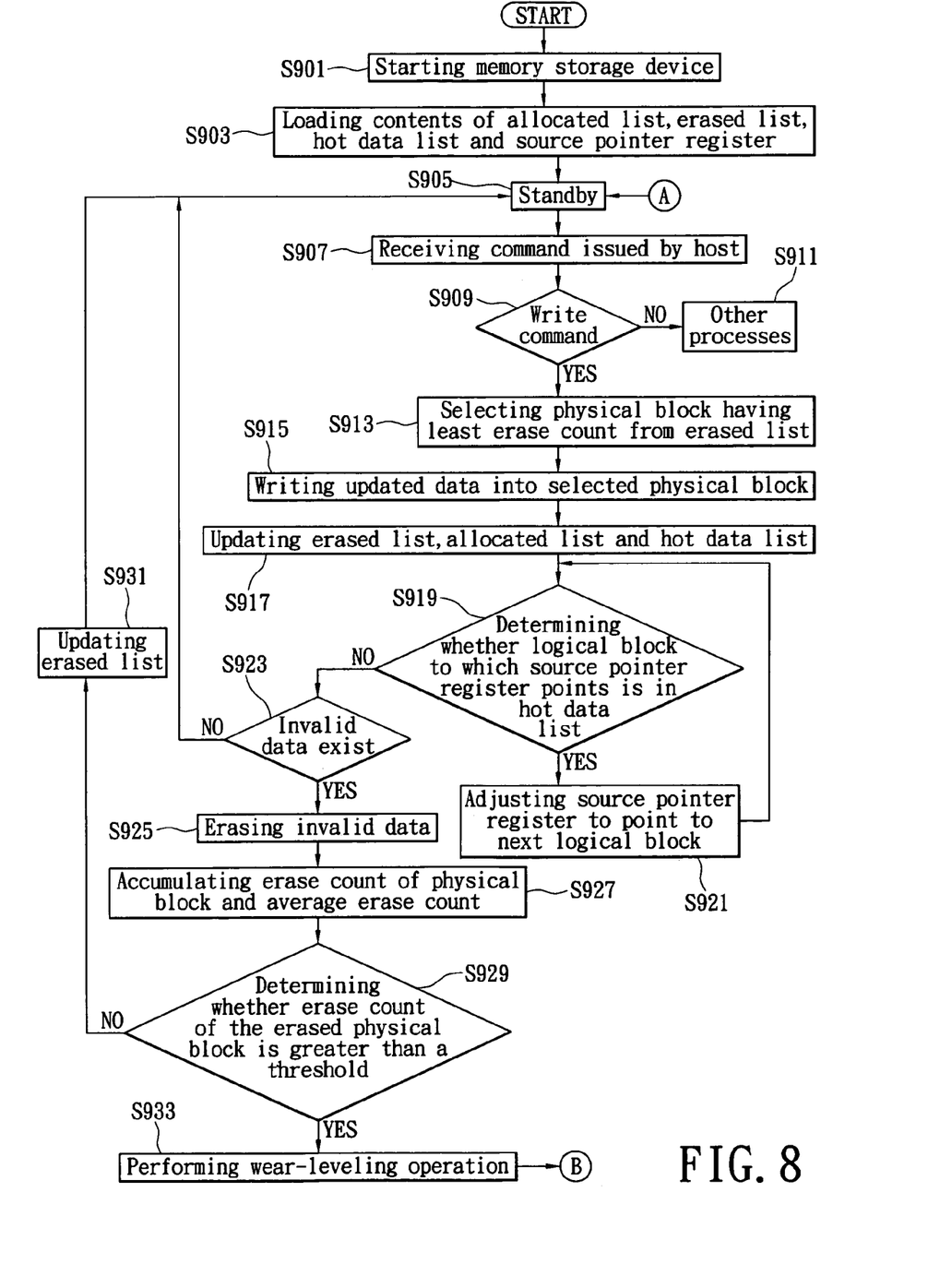
FIGS. 8~9 show a stepwise flowchart for an embodiment of the control method of the memory storage device according to the present invention.
Figure 9:
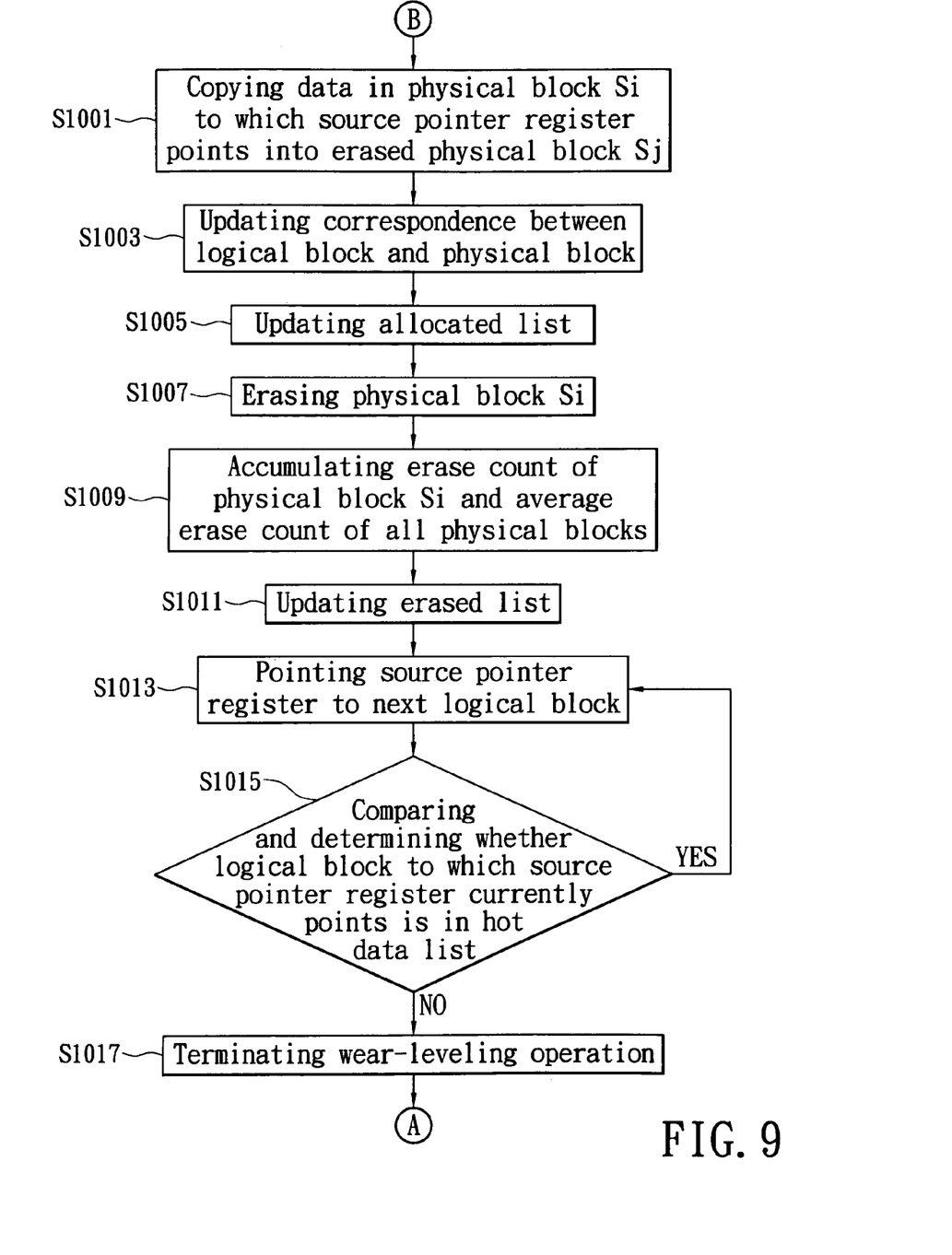

Finally, refer to FIGS. 8 and 9, wherein a stepwise flowchart for an embodiment of the control method of the memory storage device according to the present invention is shown. Relevant system architecture and data process method can be conjunctively referred to FIGS. 2~7B. As depicted in FIG. 8, such a control method comprises the following steps:

first of all, starting the memory storage device 23 (STEP S901), and loading the contents of the erased list 23191, allocated list 23193, hot data list 23195 and source pointer register 23197 in the register unit 2319 (STEP S903); after the initialization, letting the memory storage device 23 enter into a standby status (STEP S905) and wait for a command from the host 21; as the memory storage device 23 receives a command issued from the host 21 via the system interface 2311 (STEP S907), determining, by the control unit 231, whether the command is a write command for updated data (STEP S909), indicating intending to write the updated data from the host 21 to the storage unit 233; if it is not a write command for updated data, then executing relevant operations of the received command (STEP S911); otherwise, starting the dynamic wear-leveling operation, which selects the physical block having the least accumulated erase count from the erased list 23191 (STEP S913), writes the updated data into the selected physical block (STEP S915), and then the microprocessor 2317 updates the erased list 23191, allocated list 23193 and hot data list 23195 based on the aforementioned actions (STEP S917); that is, to record the address of the logical block of the updated data in the hot data list 23195, thereby allowing it to become one of the specific logical blocks (STEP's S913~S917 can be referred to FIGS. 3A, 4A and 4B);

subsequently, the microprocessor 2317 determines whether the logical block to which the source pointer register 23197 points is a specific logical block pointed in the hot data list 23195 points (STEP S919); if yes, then adjusting the source pointer register 23197 to sequentially point to the next logical block (STEP S921), then next comparing it with the hot data list 23195; otherwise, if the logical block to which the source pointer register 23197 points is not in the hot data list 23195, indicating the data stored in the logical block to which the source pointer register 23197 points should be infrequently updated, suitable for being placed in the physical block having higher erase count; meanwhile, checking and determining whether there exist physical blocks occupied by invalid data in the storage unit 233 (STEP S923); if no, then returning to the standby status to wait for the next command (STEP S905); otherwise, i.e. invalid data do exist, then executing the erase operation (STEP S925), thereby erasing the physical block occupied by such invalid data (STEP's S919~S925 can be referred to FIGS. 5A and 5B);

after completing the erasure of the physical block occupied by such invalid data, incrementing the accumulated erase count of the physical block and updating the average erase count of all physical blocks $EC_{avg}$ (STEP S927); then determining whether the erase count of the erased physical block is greater than a prescribed threshold (STEP S929); if no, then, after updating the erased list 23191 based on the above-said block erase process (STEP S931), returning to the standby status (STEP S905); otherwise, i.e. if the determination in STEP S929 is yes, indicating the condition for wear-leveling is fulfilled, thus performing the wear-leveling operations (STEP S933);

upon start of the wear-leveling operation, copying, by the microprocessor 2317, the corresponding physical block (hereunder referred as $S_i$ to represent such a physical block) of the logical block to which the source pointer register 23197 points into the physical block $S_j$ (STEP S1001), and updating the L2P translation table 33 based on the modified block correspondence (STEP S1003); next, adding the physical block $S_j$ into the allocated list 23193 (STEP S1005) (STEP's S297~S1005 can be referred to FIGS. 6A and 6B);

since the data in the physical block $S_i$ has been moved to the physical block $S_j$ for storage, thus erasing the physical block $S_i$ (STEP S1007), thereby allowing to write other new data therein; after the erase operation, accumulating the erase count of the physical block $S_i$, calculating the average erase count of all physical blocks (STEP S1009), and adding the address of the physical block $S_i$ into the erased list 23191 (STEP S1011);

after completion of the aforementioned operations, adjusting, by the microprocessor 2317, the source pointer register 23197 to point to the next logical block (STEP S1013), and comparing and determining whether the logical block to which the source pointer register 23197 currently points appearing in the hot data list 23195 (STEP S1015); if yes, then sequentially moving the source pointer register 23197 and repeating the comparing process in STEP S1015; if, contrarily, the logical block to which the source pointer register 23197 currently points not appearing as the specific logic block in the hot data list 23195 (STEP S1017), then returning to the standby status (STEP's S1007~S1017 can be referred to FIGS. 7A and 7B).

In this way, the control unit 231 has, through copying, moved the stored user data recorded in the physical block having the least accumulated erase count in the allocated list 23193 to the physical block having the greatest accumulated erase count in the erased list 23191. Thereby, it is possible to change and release the physical block used by the data having not been updated for quite a while, allowing the physical block having lower erase count to be moved from the allocated list 23193 to the erased list 23191, thus enabling subsequent write of updated data and, moreover, the effect of effective wear-leveling.

Through the detailed descriptions set forth hereinbefore, it is appreciated that the memory storage device and control method thereof according to present invention can, by means of management on the hot data list and the source pointer register, correctly identify static data not updated for a long time, and move such static data not updated for a long time to the physical block having higher erase count, so as to release the physical block occupied by static data and prevent excessive wearing in the physical block having higher erase count; therefore, the present invention can more concretely execute the wear-leveling, thereby more effectively exploiting the useable life cycle that the Flash memory storage device ought to present. The present invention has the following advantages:

1. through controlling whether to trigger wear-leveling in executing the dynamic wear-leveling operation, it is not required to alternatively spend idle time by the control unit in executing static wear-leveling operation, thereby preventing the drawback of massive consumption of system resources;

2. in executing the dynamic wear-leveling operation, it will select at higher priority the physical block having lower accumulated erase count from the erased list to record the updated data, thus accelerating the process of accumulated erase count average; and it also determines whether the updated data should be moved to the physical block having an erase count reaching the threshold due to belonging to non-hot data by means of determining whether the logical block of the updated data is in the hot data list, thus avoiding copying hot data into the physical block having higher accumulated erase count in the static wear-leveling operation, and also significantly simplifying the process of locating the physical block having higher accumulated erase count to be used as the storage for non-hot data from the erased list, further reducing the operation time, allowing to lessen controller load and memory requirements;

3. in executing data write and dynamic wear-leveling operations, during erase process on the physical block occupied by invalid data, it also simultaneously checks whether the accumulated erase count of the erased physical block has reached the starting value for initiating the wear-leveling operation. In this way, it is possible to simplify the determination process for initiation of the wear-leveling operation, thus eliminating required operation processes, operation time as well as induced load and memory requirements on the control unit caused by statistic analyses or searching and comparing the accumulated erase counts of the physical blocks;

4. through the cyclic approach of directly using the source pointer register to point step-wise from the start address of the logical block address distribution to the end address of the maximum storage space, it is possible to avoid logical blocks occupied by hot data and selectively execute the wear-leveling on the physical having lower accumulated erase count. Therefore, it is possible to largely simplify the operation processes for searching for the physical block having lower accumulated erase count from the allocated list and moving off the data in the physical block, which may reduce operation time, lessen controller load and memory requirements, and also effectively adjust the record position of user data storage in all logical blocks;

5. by adjusting the threshold offset $EC_{th}$, it is possible to conveniently achieve the effects of modifying the execution frequency of wear-leveling operation and the target average level. That is, by enlarging the threshold offset $EC_{th}$, it may lead to lower execution frequency of wear-leveling operation and relatively uneven accumulated erase counts; contrarily, while reducing the threshold offset $EC_{th}$, it may result in higher execution frequency of wear-leveling operation and more uniform accumulated erase counts.

The illustrations set forth hereinbefore simply disclose the detailed descriptions and appended drawings of the present invention, rather than being used to limit the present invention thereto. The scope of the present invention should be based on the following claims, and all changes, alternations or modifications that any skilled ones in the art can conveniently consider in the field of the present invention are deemed to be encompassed by the scope of the present invention delineated in the following claims.

What is claimed is:

1. A control method of a memory storage device providing a storage space composed of a plurality of physical blocks corresponding to a plurality of logical blocks in a file system, the control method comprising the following steps:
   providing a hot data list for recording addresses of specific logical blocks of the plurality of logical blocks;
   providing a source pointer register having an address stored therein pointing to one of the plurality of the logical blocks;
   providing an erased list for recording addresses of physical blocks that have been erased;
   selecting a physical block associated with a least accumulated erase count from the erased list;
   executing a write operation for an updated data for writing the updated data along with an original data stored in a prior physical block corresponding to the one logical block address stored in the source pointer register into the selected physical block associated with the least accumulated erase count, and placing the address of the one logical block now corresponding to the selected physical block storing the updated data in the hot data list;
   comparing and determining whether a next logical block to which the source pointer register points is one of the specific logical blocks;
   erasing the prior physical block that had stored the original data when the logical block to which the source pointer register points is not one of the specific logical blocks;
   determining whether an accumulated erase count associated with the erased prior physical block is greater than a predetermined threshold; and
   when the accumulated erased count associated with the erased prior physical block is greater than the predetermined threshold executing a static wear-leveling operation for storing data from a physical block corresponding to a logical block which the source pointer register points that is not one of the specific logical blocks into the erased prior physical block.

2. The control method according to claim 1, further comprising:
   providing an allocated list, used to record addresses of physical blocks that have been allocated with original data and the updated data.

3. The control method according to claim 2, further comprising the following steps:
   updating the erased list by deleting the address of the selected physical block associated with the least accumulated erase count from the erased list; and
   updating the allocated list for recording the address of the selected physical block-associated with the least accumulated erase count into the allocated list.

4. The control method according to claim 2, wherein the addresses in the erased list are arranged from small to great, or vice versa, based on the accumulated erase counts of the plurality physical blocks.

5. The control method according to claim 1, further comprising adjusting the source pointer register by causing the source pointer register to point to another logical block when the source pointer register points to the address of one of the specific logical blocks in the hot data list.

6. The control method according to claim 1, wherein the threshold is an averaged erase count of all the plurality physical blocks and a prescribed threshold offset.

7. A memory storage device, the memory storage device comprising:
   a storage device, consisting of a storage space having a plurality of physical blocks corresponding to a plurality of logical blocks of a file system;
   a hot data list for recording addresses of specific logical blocks of the plurality of logical blocks; and
   a source pointer register, with an address stored therein pointing to one of the plurality of the logical blocks;
   wherein the address of the one logical block to which the source pointer register points is adjusted based on whether the one logical block to which the source pointer register points is one of the specific logical blocks, and if so, the address stored in the source pointer register is adjusted to be an address of another logical block, if the one logical block to which the source pointer register points is not one of the specific logical blocks, a physical block that had stored an original data and was updated to another physical block is erased before an accumulated erase count associated with the erased physical block is larger than a predetermined threshold;
   wherein when the accumulated erase count is larger than the predetermined threshold, data from a physical block corresponding to a logical block whose address is stored in the source pointer register is stored into the erased physical block.

8. The memory storage device according to claim 7, wherein the device further comprises a temporary unit including:
   an erased list, used to record addresses of physical blocks that have been erased; and
   an allocated list, used to record addresses of physical blocks allocated with data.

9. The memory storage device according to claim 7, wherein the device further comprises a control unit including:
- a system interface, coupled to a host and acting as a transmission interface of command and data between the host and the memory storage device;
- a data transmission buffer, coupled to the system interface for registry of an updated data;
- a microprocessor, executing commands issued by the host to the device; and
- a memory interface, coupled between the data transmission buffer and the storage unit and controlled by the microprocessor for data transmissions to the storage unit.

10. The memory storage device according to claim 9, wherein the address of the one logical block stored in the source pointer register is adjusted by the microprocessor.

* * * * *